Dec. 16, 1952  R. W. SEEGER ET AL  2,622,188
MULTIPLE FLASH LAMP
Filed Aug. 7, 1950  2 SHEETS—SHEET 1
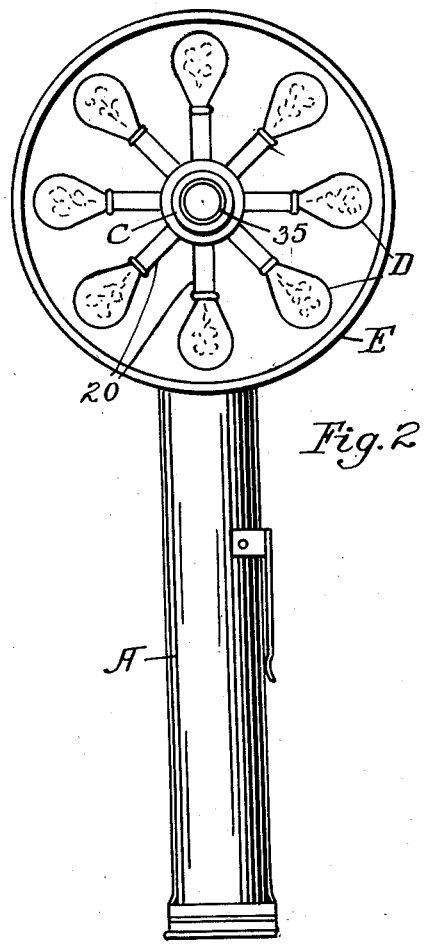
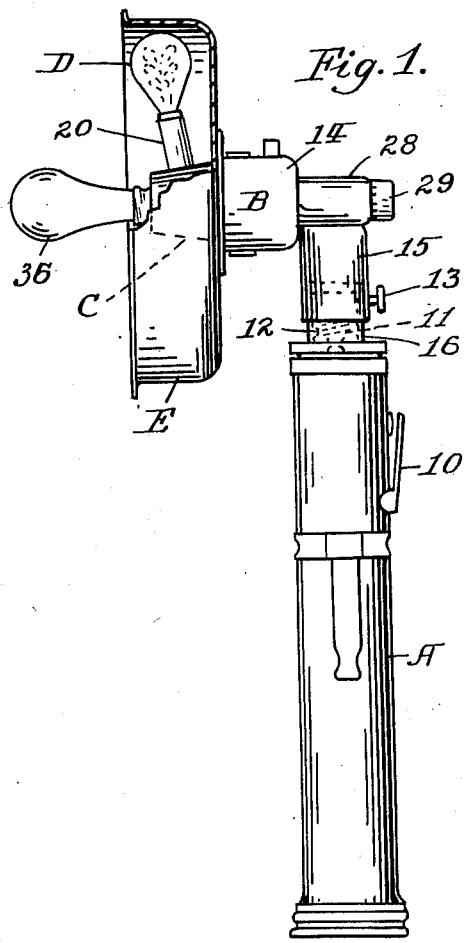
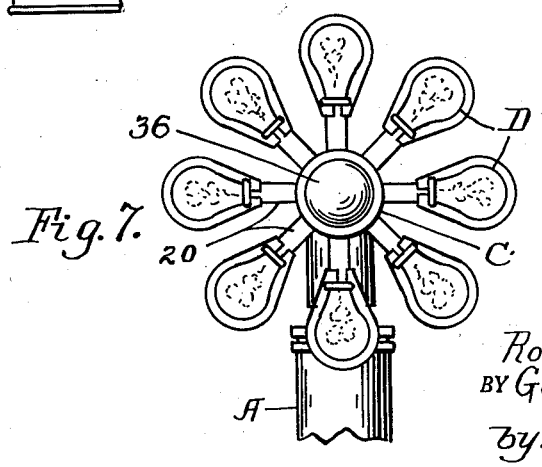
INVENTORS
Robert W. Seeger &
BY Gordon P. Felts
by: F. G. Bradbury
Attorney.

Dec. 16, 1952  R. W. SEEGER ET AL  2,622,188
MULTIPLE FLASH LAMP
Filed Aug. 7, 1950  2 SHEETS—SHEET 2
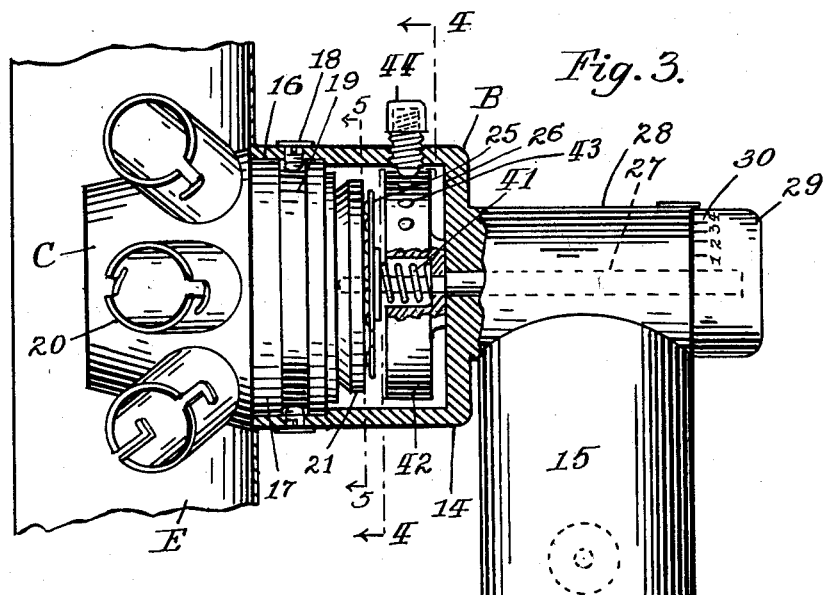
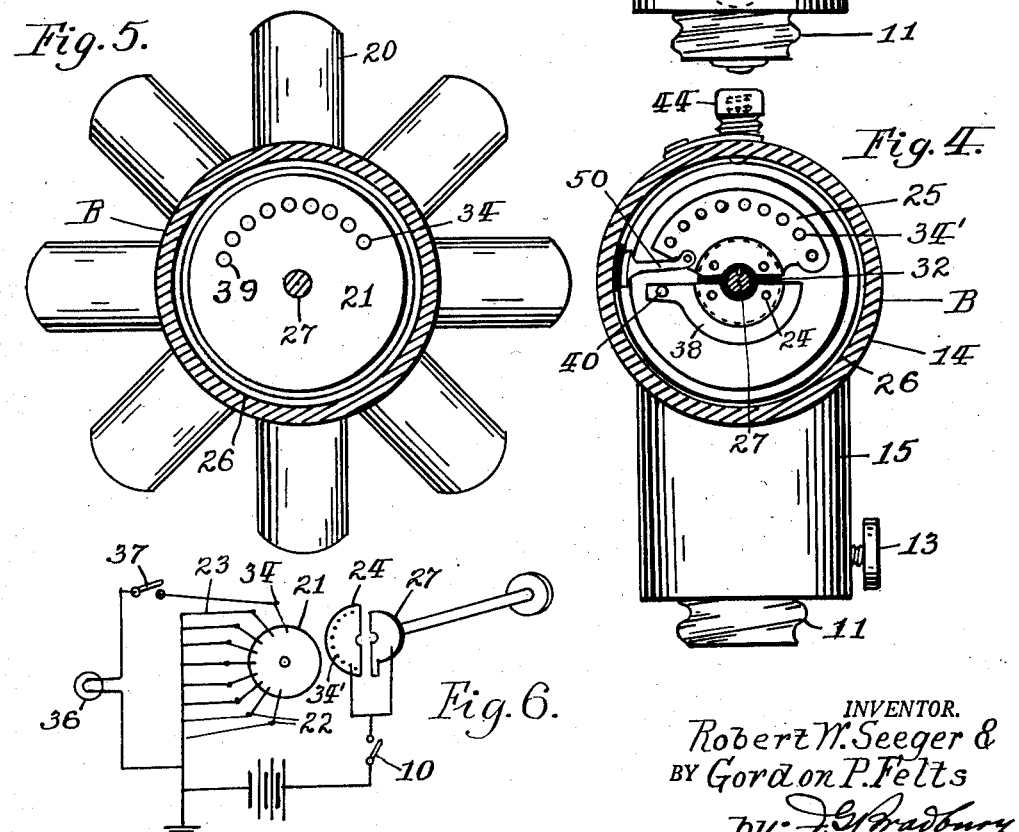
INVENTOR.
Robert W. Seeger &
BY Gordon P. Felts
by: T. G. Bradbury
Attorney Patented Dec. 16, 1952

2,622,188

UNITED STATES PATENT OFFICE 2,622,188

MULTIPLE FLASH LAMP

Robert W. Seeger and Gordon P. Felts, Pasadena, Calif., assignors of one-third to Maxwell H. Lewis, South Pasadena, Calif.

Application August 7, 1950, Serial No. 178,136

3 Claims. (Cl. 240—1.3)

1

Our invention relates to the operation of illuminating apparatus for photographic purposes so as to aid an operator in taking flash light pictures in succession or by selectively controlling the volume and strength of illumination. An object of our invention is the production of simple and effective apparatus whereby the operator may quickly and easily, without delay operate our improved apparatus in conjunction with a camera so as to produce either or both of the above results. More particularly our invention is directed to multiple flash light apparatus in which the illuminating elements are held in stationary position without having to be moved and in which single or a selected number or group of flash lamps can be operated at a time, thus providing the user with means by which brilliancy and volume of light which is flashed can be easily and quickly regulated and controlled. Further objects and advantages of our invention will be set forth by the following description.

In the accompanying drawings forming part of this specification, Fig. 1 is a side elevation of one species of our improvement, in which part of the structure is broken away and shown in section; Fig. 2 is a front elevational view of the structure shown in Fig. 1; Fig. 3 is a side elevation, partly broken away and in longitudinal section showing part of the head portion or housing of our improved device; Fig. 4 is a sectional view taken approximately on the line 4—4 of Fig. 3; Fig. 5 is a sectional view taken approximately on the line 5—5 of Fig. 3 when the reflector is removed; Fig. 6 is a diagram of the electric circuit which is employed by the device, and Fig. 7 is a front elevational view showing an alternative construction when individual reflectors are employed with the flash lamps instead of a single reflector for the entire group of lamps.

In the drawings, A represents an ordinary battery case containing several dry cells (not shown) from which electric current is supplied for operating flash lamps, said current which is supplied for the lamps being controlled by the conventional hand operated switch 10 on the battery case, which is adapted to complete an electric circuit through the flash lamps D, as shown in Fig. 6, in the hereinafter described manner.

The flash light bulbs are assembled within a reflector E in a circular group, said group being supported upon a switch contained housing B, which latter is electrically connected with the battery cells in the battery case by a threaded plug 11 and connecting socket 12. The housing B has a horizontal body or head portion 14 and

2 an integral depending tubular leg 15. The battery case has an upwardly extended collar 16 over which the leg 15 telescopes and is held by the binding screw 13. The leg 15 contains the threaded plug 11 and the battery case has a companion socket 12 by which electric connection is adapted to be made through the housing between the lamp bulbs and the battery cells in the manner hereinafter described. The housing B is thus removably mounted on and carried by the battery case A.

The forward portion of the housing head 14 resembles a cylindrical shell and has connected therewith by a horizontal slip joint 16, the stationary lamp supporting hub C. This hub has its neck portion 17 socketed in the housing head 14 and removably keyed therein by the set screws 18 which engage in the annular groove 19 in said neck. The lamp supporting hub C is stationary and supports a plurality of radiating electric lamp sockets 20 on its forward end, which are conventional and in which ordinary flash light bulbs D are removably held. These bulbs contain ordinary combustible flash light material such as magnesium shavings and are air exhausted. A suitable reflector E is supported back of the lamps over the supporting hub C as shown in Fig. 3. The lamps may be evenly spaced apart circumferentially about the axis of hub C as shown.

The inner end of the neck portion 17 of the supporting hub C, within the housing has a coaxially disposed disk 21, of plastic or other insulating material, which is rigidly supported and secured endwise to said hub by cementing or other suitable means. The inner end face of the disk is provided with a series of cupped electrical conducting contacts 34 (Fig. 5), which correspond with the flash lamps and are evenly spaced apart in a relatively short concentric arc. These contacts are electrically connected with the lamps, that is one contact 34 for each corresponding lamp bulb D. The contacts are connected with terminals in the lamp sockets by suitable conductors 23, which are indicated diagrammatically in Fig. 6. The return portion of the circuit to the battery cells in the battery case is grounded.

For making contact to ignite any desired number of flash lamps D, we provide a metallic switch segment 25 in the chamber 26 of the housing, said segment being mounted on the disk of insulating material 32 (Fig. 4), which in turn is secured concentrically on the hand operating spindle shaft 27, which is coaxially journaled and projected through the horizontally extended body portion 28 (Fig. 3), of the housing B. The switch segment 25 has a circular series of contact nubs 34', which coact with the cupped contacts 34. A hand operating spindle knob 29 is secured on the outer projecting end of shaft 27, the perimeter of said knob being indexed at 30 so that the operator, by turning the knob, can select any one or more of the lamps to be flashed. When the spindle thus produced is revolved by its knob 29 into selected contact position so that electric current from battery A is connected and caused to energize the desired corresponding flash lamp bulbs, the switch segment 25 is secured to the supporting disk 32 by riveting at 24 or by other suitable means and is spaced from the shaft to prevent short circuiting. The switch segment 25 permits one lamp bulb, or any chosen number of bulbs at a time to be operated, said operation being controlled by adjusting the knob according to its index and by closing switch 10.

An additional electrical connecting contact 39 is provided at one end of the series 34. This additional contact is connected with a branch circuit which includes the service socket 35 (Fig. 2), in the forward end portion of the hub C, and a switch 37 (Fig. 6), by which either a lighting bulb 36 or an extension service line can be connected. The switch segment 25 is designed so as to make electric connection when desired so as to furnish electric current to the socket 35 and its adjunct connected lamp or to an extension conductor.

The switch or commutator mechanism as shown in Fig. 4 is double, it having the switch quadrant 25 which has been described and an additional single arm selector switch 38 which is also secured by riveting 24 on the insulating disk 32. This switch arm has an electrical contact indenture 40 which is adapted to engage the annular series of recessed contacts 34 in succession as the switch assembly is revolved by hand into selected position by the knob 29. Thus by the use of switch 38 the flash bulbs may be ignited individually and in succession and the service lamp energized by manipulating the knob and closing switch 10. Normally the electrical contacts between the switch elements 21, 25 and 38 are urged firmly together to make close connections by the helical expansion spring 41. Also to assist in securely holding the commutator switching unit in any rotative contact position, a stop disk 42 is secured on shaft 27 and is provided with a circular series of indentures 43 in its perimeter, which are spaced circumferentially to correspond with the positions assumed by the switch contact indentures 34. A spring pressed friction retarding ball catch 44 is adapted to engage the holding disk 42 in said indentures 43 and releasably retain the switch elements in any one of their selected engaging positions.

In Fig. 6 we have shown a diagram of the circuit connections which are employed with our improvements. This diagram illustrates the return circuit which is grounded on the battery case. The switch or commutator means heretofore described is primarily controlled by switch 10 and the flash lamps and service supply means are selectively operated by the switch units 24 and 27. Electrical current which is supplied by the battery cells in the battery case is controlled by switch 10. The current thus supplied is connected with a spring brush contact 58 and this brush contact element presses against the switch members 25 and 38 as the latter are revolved and set by turning the knob 29. The brush contact is mounted on and insulated from the inner wall of the chamber within the housing B.

*Operation*

Starting from zero on the hand knob, switch plate 25 is made to connect the first lamp contact, or Nos. 1 and 2 lamp contacts. and so on up to 1 to 9 contacts inclusive. By then closing the main switch 10 after setting the selector switch on any of these selected contacts the lamps so connected are caused to flash. Contact switch 38 can also be made to connect only one contact point at a time and can jump from 1 to 9 without shooting any lamp bulb therebetween while the switch 10 is open. Also the switch member 38 may be used to flash the lamps in succession while the lamps remain stationary.

The battery case A is a ground connection from the battery cells. All of the lamp bulbs are ground connected with the housing and battery case. The center contacts of the sockets are connected in sequence 1 to 9 inclusive with the contacts 35 which are seated in the inner circular face of the disk 21. The handle knob 29 is used to select any lamp bulb to be flashed or used and may be graduated by the scale 30 to correspond with the lamp bulbs and their relative positions.

Modifications in the construction and arrangement of the parts of our improved apparatus are contemplated within the spirit of the invention and the scope of the following claims.

We claim:

1. A flash lamp structure of the class set forth, comprising a normally horizontally disposed switch housing, an annular reflector coaxially supported in stationary position on said switch housing, a plurality of stationary radiating flash lamp sockets supported in a concentric stationary group within said reflector, a battery case connected normally attached at right angles to said switch housing, a hand operated switch on said battery case, a source of current in said case, an energizing electric circuit from said hand operated switch to said lamp sockets, a selective switch connected with said circuit within said switch housing, said selective switch comprising a circular, coaxially disposed, stationary, insulated disc carrying radially disposed, cupped electrical conducting contacts corresponding to and electrically connected with said lamp sockets, a circular, coaxially disposed, rotatable, metallic switch segment having radially disposed contact nubs coacting with said cup contacts, a spindle shaft rotatably received at one end in said insulated disc and reaching to a point outside said switch housing, spring means around said shaft normally forcing said metallic switch segment against said stationary disc, a stop disc on said shaft carrying circumferentially disposed indentures corresponding in position to said contact nubs, spring pressed friction means coacting with said indentures for holding said stop disc in predetermined positions corresponding to preselected switch engaging positions, a hand operated cylindrical knob mounted on the extremity of the spindle shaft outside said switch housing and indicia on said knob corresponding to said flash lamp sockets.

2. A flash lamp structure of the class set forth, comprising a normally horizontally disposed switch housing, an annular reflector coaxially supported in stationary position on said switch housing, a plurality of stationary radiating flash lamp sockets supported in a concentric stationary group within said reflector, a battery case connected normally attached at right angles to said switch housing, a hand operated switch on said battery case, a source of current in said case, an energizing electric circuit from said hand operated switch to said lamp sockets, a selective switch connected with said circuit within said switch housing, said selective switch comprising a circular, coaxially disposed, stationary, insulated disc carrying radially disposed, cupped electrical conducting contacts corresponding to and electrically connected with said lamp sockets, a circular, coaxially disposed, rotatable, metallic switch segment having radially disposed contact nubs coacting with said cup contacts, a spindle shaft rotatably received at one end in said insulated disc and reaching to a point outside said switch housing, spring means around said shaft normally forcing said metallic switch segment against said stationary disc, a hand operated cylindrical knob mounted on the extremity of the spindle shaft outside said switch housing and indicia on said knob corresponding to said flash lamp sockets.

3. A flash lamp structure of the class set forth, comprising a normally horizontally disposed switch housing, an annular reflector coaxially supported in stationary position on said switch housing, a plurality of stationary radiating flash lamp sockets supported in a concentric stationary group within said reflector, a battery case connected normally attached at right angles to said switch housing, a hand operated switch on said battery case, a source of current in said case, an energizing electric circuit from said hand operated switch to said lamp sockets, a selective switch connected with said circuit within said switch housing, said selective switch comprising a circular, coaxially disposed, stationary, insulated disc carrying radially disposed, cupped electrical conducting contacts corresponding to and electrically connected with said lamp sockets, a circular, coaxially disposed, rotatable, metallic switch segment having radially disposed contact nubs coacting with said cup contacts, a spindle shaft rotatably received at one end in said insulated disc and reaching to a point outside said switching housing, spring means around said shaft normally forcing said metallic switch segment against said stationary disc, and a hand operated cylindrical knob mounted on the extremity of the spindle shaft outside said switch housing for setting the switch contacts in predetermined position.

ROBERT W. SEEGER.
GORDON P. FELTS.

REFERENCES CITED

The following references are of record in the file of this patent:

UNITED STATES PATENTS

| Number | Name | Date |
|---|---|---|
| 716,940 | Schmidt | Dec. 30, 1902 |
| 1,274,009 | Courtier | July 30, 1918 |
| 2,244,114 | Noir | June 3, 1941 |
| 2,443,357 | McMath et al. | June 15, 1948 |
| 2,524,435 | Emigh | Oct. 3, 1950 |

FOREIGN PATENTS

| Number | Country | Date |
|---|---|---|
| 849,521 | France | Aug. 21, 1939 |

OTHER REFERENCES

G. E. Review, April, 1944, page 20.